United States Patent
Debata et al.

(10) Patent No.: US 11,327,549 B2
(45) Date of Patent: May 10, 2022

(54) METHOD AND APPARATUS FOR IMPROVING POWER MANAGEMENT BY CONTROLLING OPERATIONS OF AN UNINTERRUPTIBLE POWER SUPPLY IN A DATA CENTER

(71) Applicant: DELL PRODUCTS, LP, Round Rock, TX (US)

(72) Inventors: Smruti Ranjan Debata, Basavanagar (IN); Ravishankar Kanakapura Nanjundaswamy, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 220 days.

(21) Appl. No.: 16/692,392

(22) Filed: Nov. 22, 2019

(65) Prior Publication Data

US 2021/0157387 A1 May 27, 2021

(51) Int. Cl.
*H02J 9/06* (2006.01)
*G06F 1/3234* (2019.01)

(52) U.S. Cl.
CPC .............. *G06F 1/3234* (2013.01); *H02J 9/06* (2013.01)

(58) Field of Classification Search
None
See application file for complete search history.

(56) References Cited

U.S. PATENT DOCUMENTS

| | | | |
|---|---|---|---|
| 7,561,411 B2* | 7/2009 | Johnson, Jr. ......... | H05K 7/1457 361/600 |
| 7,849,335 B2 | 12/2010 | Terry et al. | |
| 9,280,193 B2* | 3/2016 | Weilnau, Jr .............. | G06F 1/30 |
| 9,552,053 B2 | 1/2017 | O'Connor et al. | |
| 10,164,464 B1* | 12/2018 | Ross .......................... | G06F 1/30 |
| 10,254,808 B2 | 4/2019 | Messick et al. | |
| 2005/0071092 A1* | 3/2005 | Farkas ...................... | G06F 1/26 702/60 |
| 2005/0229037 A1* | 10/2005 | Egan .................... | G06F 11/2015 714/14 |
| 2010/0038963 A1* | 2/2010 | Shetty ...................... | G06F 1/28 307/62 |
| 2010/0301675 A1* | 12/2010 | Chen ....................... | H02J 9/005 307/66 |
| 2011/0127836 A1* | 6/2011 | Gonzales .............. | H02J 7/0026 307/66 |
| 2012/0086269 A1* | 4/2012 | Nakano ................... | H02J 9/062 307/23 |
| 2012/0313437 A1* | 12/2012 | Latham ................. | H02J 7/0018 307/65 |
| 2012/0331317 A1* | 12/2012 | Rogers ................. | G06F 1/3212 713/320 |

(Continued)

*Primary Examiner* — Vincent H Tran
(74) *Attorney, Agent, or Firm* — Larson Newman, LLP (57) ABSTRACT

A system having multiple racks with a power supply unit (PSU) in each rack, and multiple grids including an uninterruptible power supply (UPS) in each grid to supply power to each PSU. A console determines an amount of wear levelling and an amount of workload to be supported by each UPS. The console configures each UPS based upon the determined amount of wear levelling and the determined amount of workload to be supported by the UPS. Furthermore, the console facilitates an adjustment of a power capping value in each PSU to conform with the configuration of each UPS.

18 Claims, 8 Drawing Sheets

(56) References Cited

U.S. PATENT DOCUMENTS

| | | | | |
|---|---|---|---|---|
| 2013/0080793 | A1* | 3/2013 | Familiant | H02J 9/005 |
| | | | | 713/300 |
| 2014/0101474 | A1* | 4/2014 | Weilnau, Jr | G06F 1/3287 |
| | | | | 713/324 |
| 2015/0349585 | A1* | 12/2015 | Budde | H02J 7/0068 |
| | | | | 307/66 |
| 2016/0020645 | A1* | 1/2016 | Tracy | H02M 7/493 |
| | | | | 307/65 |
| 2016/0254684 | A1* | 9/2016 | Gothoskar | H02J 7/0027 |
| | | | | 455/572 |
| 2016/0370830 | A1* | 12/2016 | Miller | H02J 9/061 |
| 2017/0329383 | A1* | 11/2017 | Bailey | G06F 1/3234 |
| 2020/0019230 | A1* | 1/2020 | Rong | G06F 1/3296 |
| 2020/0081504 | A1* | 3/2020 | Ou Yang | H02J 1/106 |
| 2020/0144845 | A1* | 5/2020 | Facchini | H02J 7/00034 |

* cited by examiner

| Workload Versus Rthreshold | First Grid 310 (Active) | Second Grid 320 (Backup) |
|---|---|---|
| H + H | Up | Up |
| M + M > Rthreshold | Up | Up |
| L + L > Rthreshold | Up | Up |
| L + L < Rthreshold | Up | Down |

METHOD AND APPARATUS FOR IMPROVING POWER MANAGEMENT BY CONTROLLING OPERATIONS OF AN UNINTERRUPTIBLE POWER SUPPLY IN A DATA CENTER

FIELD OF THE DISCLOSURE

This disclosure generally relates to information handling systems, and more particularly relates to improving power management by controlling operations of an uninterruptible power supply in a data center.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A system having multiple racks with a power supply unit (PSU) in each rack, and multiple grids including an uninterruptible power supply (UPS) in each grid to supply power to each PSU. A console may determine an amount of wear levelling and an amount of workload to be supported by each UPS, and the console may configure each UPS based upon the determined amount of wear levelling and the determined amount of workload to be supported. The console facilitates an adjustment of a power capping value in each PSU to conform with the configuration of the UPS.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings.

Figure 1:
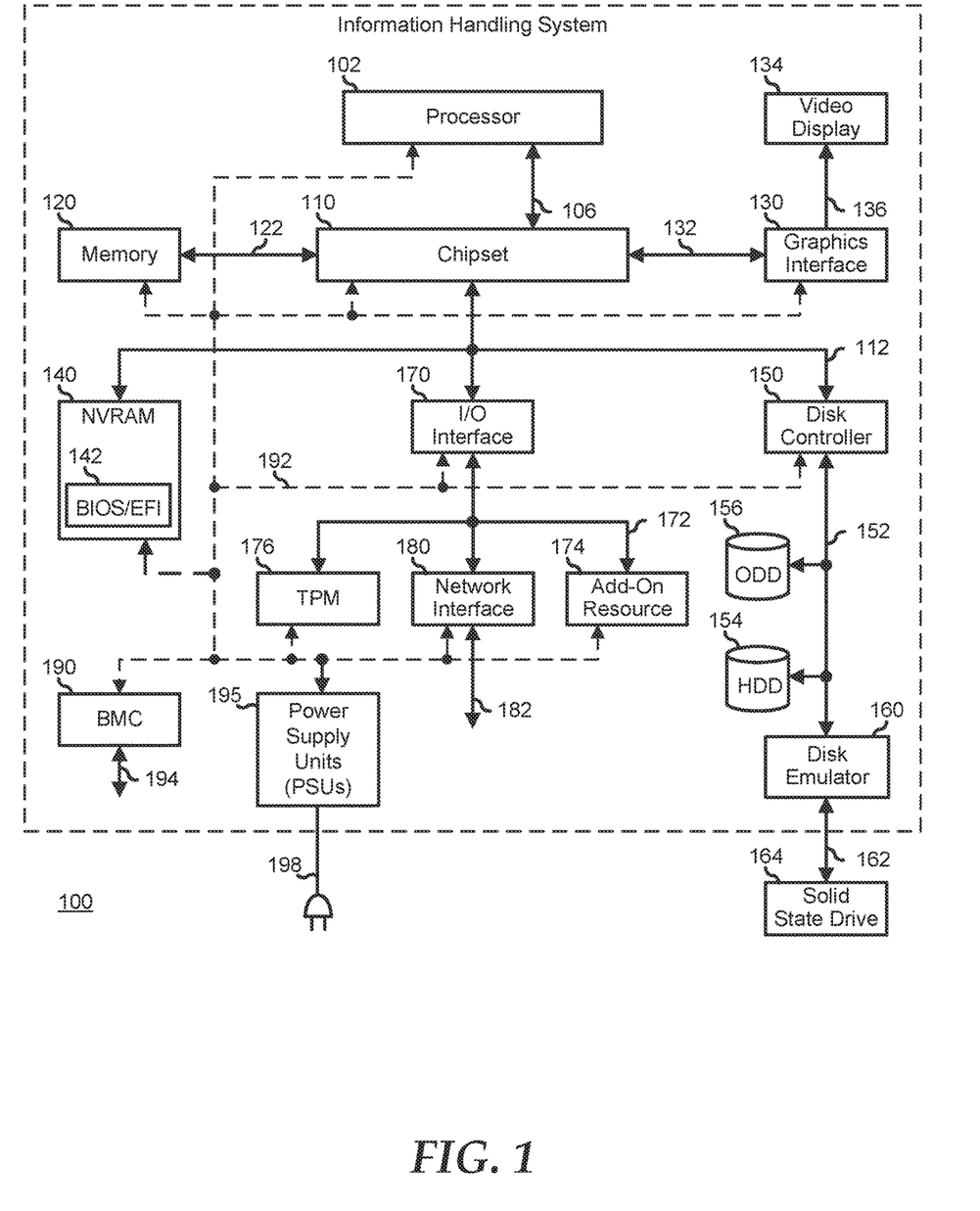
FIG. 1 is a block diagram illustrating an information handling system according to an embodiment of the present disclosure.

FIG. 1 illustrates an embodiment of an information handling system 100 including a processor 102, processor interface 106, chipset 110, memory 120, graphics adapter 130 connected to video display 134, non-volatile RAM (NV-RAM) 140 that includes a basic input and output system/extensible firmware interface (BIOS/EFI) module 142, disk controller 150, hard disk drive (HDD) 154, optical disk drive (ODD) 156, disk emulator 160 connected to solid state drive (SSD) 164, an input/output (I/O) interface 170 connected to an add-on resource 174, a trusted platform module (TPM) 176, a network interface 180, a baseboard management controller (BMC) 190, and power supply units (PSUs) 195 with a plug chord 198. The information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. The elements depicted in information handling system 100 may not be representative of all elements of information handling systems in general. Moreover some elements as depicted in information handling system 100 may not be applicable to all information handling systems as described in the present embodiments.

Chipset 110 represents an integrated circuit or group of integrated circuits that manages data flow between the processor 102 and the other elements of information handling system 100. In a particular embodiment, chipset 110 represents a pair of integrated circuits, such as a north bridge component and a south bridge component. In another embodiment, some or all of the functions and features of chipset 110 are integrated with one or more of processors 102. Memory 120 is connected to chipset 110 via a memory interface 122. An example of memory interface 122 includes a Double Data Rate (DDR) memory channel, and memory 120 represents one or more DDR Dual In-Line Memory Modules (DIMMs). In a particular embodiment, memory interface 122 represents two or more DDR channels. In another embodiment, one or more of processors 102 include memory interface 122 that provides a dedicated memory for the processors. A DDR channel and the connected DDR DIMMs can be in accordance with a particular DDR standard, such as a DDR3 standard, a DDR4 standard, a DDR5 standard, or the like. Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like.

Graphics adapter 130 is connected to chipset 110 via a graphics interface 132, and provides a video display output 136 to a video display 134. An example of a graphics interface 132 includes a peripheral component interconnect-express interface (PCIe) and graphics adapter 130 can include a four lane (×4) PCIe adapter, an eight lane (×8) PCIe adapter, a 16-lane (×16) PCIe adapter, or another configuration, as needed or desired. In a particular embodiment, graphics adapter 130 is provided on a system printed circuit board (PCB). Video display output 136 can include a digital video interface (DVI), a high definition multimedia interface (HDMI), DisplayPort interface, or the like. Video display 134 can include a monitor, a smart television, an embedded display such as a laptop computer display, or the like.

NV-RAM 140, disk controller 150, and I/O interface 170 are connected to chipset 110 via I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disk controller to HDD 154, to ODD 156, and to disk emulator 160. Disk interface 152 may include an integrated drive electronics (IDE) interface, an advanced technology attachment (ATA) such as a parallel ATA (PATA) interface or a serial ATA (SATA) interface, a SCSI interface, a USB interface, a proprietary interface, or a combination thereof. Disk emulator 160 permits a solid-state drive (SSD) 164 to be connected to information handling system 100 via an external interface 162. An example of external interface 162 includes a USB interface, an IEEE 1394 (Firewire) interface, a proprietary interface, or a combination thereof. Alternatively, SSD 164 can be disposed within information handling system 100.

I/O interface 170 includes a peripheral interface 172 that connects I/O interface 170 to add-on resource 174, to TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a NIC, a sound/video processing card, another add-on resource, or a combination thereof. Add-on resource 174 can be on a main circuit board, a separate circuit board or an add-in card disposed within information handling system 100, a device that is external to the information handling system, or a combination thereof.

Network interface device 180 represents a network communication device disposed within information handling system 100, on a main circuit board of the information handling system, integrated onto another element such as chipset 110, in another suitable location, or a combination thereof. Network interface device 180 includes a network channel 182 that provides an interface to devices that are external to information handling system 100. In a particular embodiment, network channel 182 is of a different type than peripheral channel 172 and network interface 180 translates information from a format suitable to the peripheral channel to a format suitable to external devices. In a particular embodiment, network interface device 180 includes a NIC or host bus adapter (HBA), and an example of network channel 182 includes an InfiniBand channel, a fiber channel, a gigabit Ethernet channel, a proprietary channel architecture, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from the processor 102, which provides various management functions for information handling system 100. In an embodiment, BMC 190 may be responsible for granting access to an external device such as a central management unit that may establish control of the elements to implement power management, cooling management, storage management, and the like. In this embodiment, the central management unit includes a console. The BMC 190 may communicate with the console using a network interface 194.

In an embodiment, the BMC 190 implements an integrated remote access controller (iDRAC) that operates to monitor and maintain system firmware, such as code stored in BIOS/EFI module 142, option ROMs for graphics interface 130, disk controller 150, add-on resource 174, network interface 180, or other elements of information handling system 100, as needed or desired. In particular, BMC 190 includes the network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

PSUs 195 may include one or more power supplies to support power requirements of the information handling system. Each one of the PSUs 195 may include hardware circuitry that can provide a source of electrical energy. The hardware circuitry can supply the electrical energy to support, for example, a system workload in the information handling system. In this example, the supporting of the system workload includes providing of the biasing voltages to the processor 102, graphics interface 130, universal serial bus drive, display screen, and other information handling system component that may require electrical energy for its operation. In a data center where the information handling system 100 serves as one of rack servers, the PSUs 195 may be connected to one or more UPS of a power network. The UPS includes a device that facilitates a transfer of power from utility or generator power sources to the PSUs 195. In various embodiments, the central management unit may implement power management of the PSUs 195 based on configurations of the one or more UPS of the power network. The central management unit may control operations of the one or more UPS of the power network to minimize costs in the data center.

Figure 2:
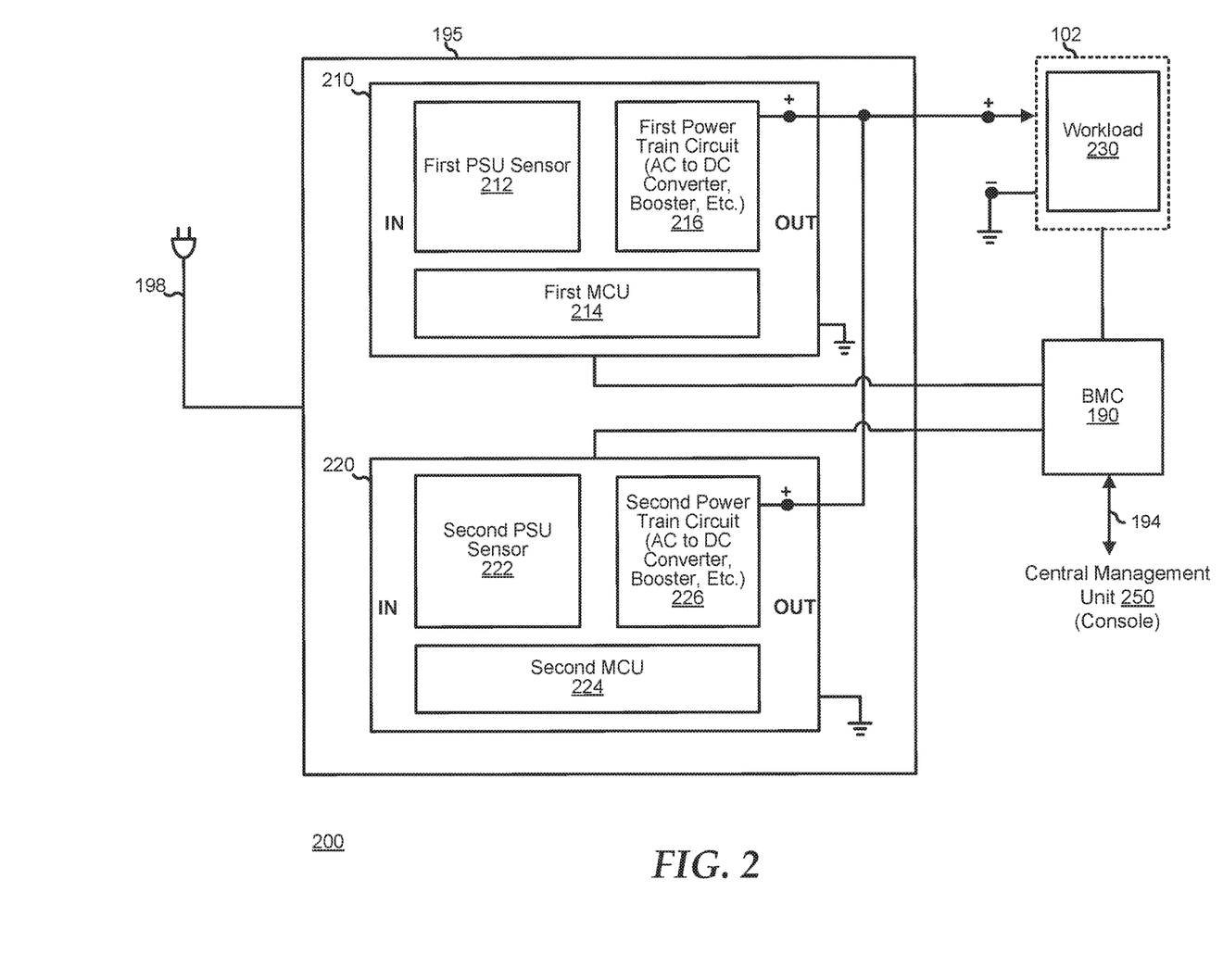
FIG. 2 is a block diagram of a portion of the information handling system according to an embodiment of the present disclosure.

FIG. 2 shows a portion 200 of the information handling system. The portion 200 includes the power supply 195 including a first PSU 210 and a second PSU 220, the processor 102 with a workload 230, and the BMC 190. The first PSU 210 includes a first PSU sensor 212, a first microcontroller unit (MCU) 214, and a first power train circuit 216. The second PSU 220 includes a second PSU sensor 222, a second MCU 224, and a second power train circuit 226. The BMC 190 can be connected to the first MCU 214, the second MCU 224, and the processor 102. The BMC 190 can be connected to a central management unit 250 such as a data center console that may establish control of the PSUs 195 to implement power management.

In various embodiments, the first PSU 210 and the second PSU 220 may supply required power to support the workload 230 and other information handling system components requiring power for operation. The first PSU 210 may be configured as a primary source of power while the second PSU 220 may be configured as a back-up PSU when the first PSU 210 is offline or malfunctioning. In other cases, the first PSU 210 and the second PSU 220 may be configured to alternately supply power, or to supply power at different time periods depending upon the amount of the workload 230 and instructions from the BMC 190. In various embodiments, the instructions from the BMC 190 may implement the power management that can be initiated by the central management unit 250.

The instructions from the BMC 190 may include reconfigurations of the first PSU 210 and/or the second PSU 220 to conform to the configurations of the UPS in the data center. In various embodiments, the central management unit 250 controls the operation of the UPS to provide electrical energy to the first PSU 210 and/or the second PSU 220 and thus, resulting to PSU reconfigurations. The control of the UPS operations may be based upon factors that can increase UPS efficiency and distribute wear levelling across all UPS in the data center. For example, the UPS is configured to supply 10 kW of electrical energy to the PSUs 195. In this example, the 10 kW configuration of the UPS may be implemented to increase UPS efficiency and to distribute the wear levelling. In a case where the PSUs 195 are operating at 20 kW and the UPS is configured to supply 10 kW of electrical energy, the PSUs may be reconfigured to correspond to the 10 kW configuration of the UPS. For example, the reconfigurations of the PSUs 195 may include an application of a power capping value in order to limit the maximum amount of power that can be drawn from the PSUs. In this example, the PSUs 195 may be reconfigured to include the power capping value of 10 kW or less in order to conform to the configurations of the UPS.

The BMC 190 may receive the power capping value and other instructions from the central management unit 250, and the BMC may forward the power capping value and other instructions to the first MCU 214. In turn, the first MCU 214 facilitates the reconfiguration of the first PSU 210 and/or the second PSU 220 based upon the received power capping value and instructions from the BMC. The power capping value may include an amount of power that may be derived, for example, from simultaneous peaks of multiple servers in the same rack. In this example, the power capping value may be lesser than the nominal power rating of the rack and thus, conserving power in the servers. The conserving of power reduces operational cost in the data center.

The first MCU 214 includes hardware circuitry that can perform tasks related to power management of the first PSU 210. For example, the first MCU 214 may receive command signals from the BMC 190 to calibrate the power capping value that may be supported by the first PSU 210. In this example, the first MCU 214 may change the previous amount of power capping value to limit the power that can be drawn from the first PSU 210. In another example, the first MCU 214 may receive command signals from the BMC 190 to turn OFF the first PSU 210 or to place the first PSU in standby mode. In this other example, the first MCU 214 reconfigures the first PSU 210 and sends this information to the BMC 190. The BMC 190 communicates the updated first PSU configuration to the central management unit 250.

In various embodiments, the workload 230 may represent an amount of computational work or tasks that the processor performs. In multi-core processors, the workload 230 may include usage rates during non-idle periods on each core. The usage rates can be based from an amount of time that the core is used to process instructions as opposed to elapsed time when the core is in idle mode. In other cases, the workload 230 may represent the power consumption by information handling system components such as video display, sound device, and the like. In an embodiment, the processor 102 may send the amount of workload to the BMC 190, and the BMC updates the central management unit 250.

The first power train circuit 216 includes hardware circuitry to convert the received electrical energy into electrical energy source that is usable by the processor 102 and other components of the information handling system. For example, the first power train circuit 216 converts 120 VAC or 240 VAC electrical energy into 5-12 VDC source. In this example, the first power train circuit 216 may include alternating current to direct current (AC/DC) rectifier, booster, or other topologies and/or a filter circuit.

The first PSU sensor 212 includes hardware circuitry that is configured to monitor temperature of the first power train circuit 216, and monitor the electrical voltage or current at the first PSU 210. The first PSU sensor may send the monitored electrical voltage or current to the first MCU 214, and the first MCU communicates the monitored information to the BMC 190.

The operation of the second PSU 220 is similar to the first PSU 210. In various embodiments, the present configurations of the second PSU 220 are transmitted to the central management unit 250 through the BMC 190. At a configured time interval, the BMC 190 may receive the instructions from the central management unit 250 to reconfigure the second PSU 220. In other cases, the instructions may include reconfiguring of the second PSU 220 as a backup PSU.

Figure 3:
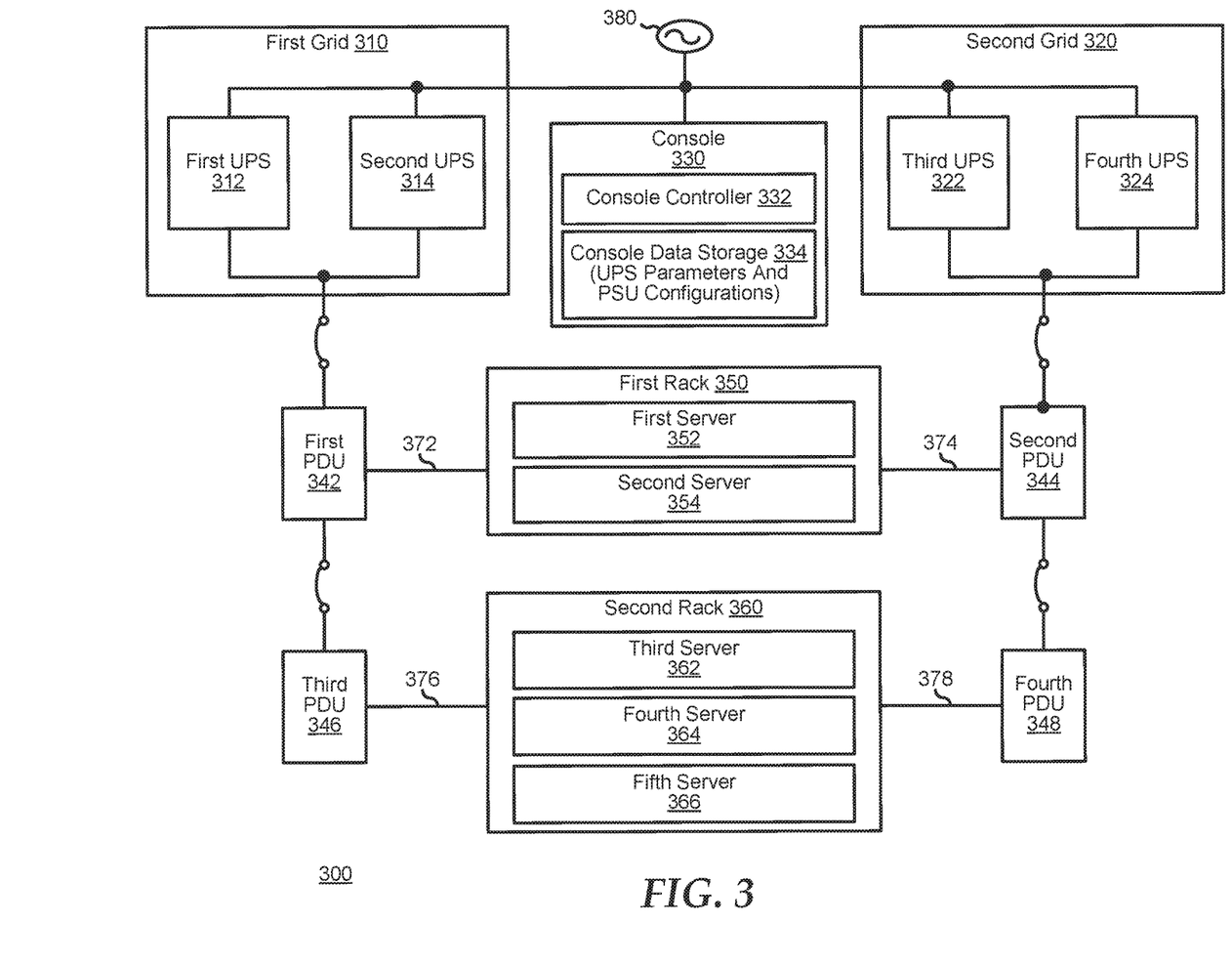
FIG. 3 is a block diagram of a UPS setup in a data center according to an embodiment of the present disclosure.

FIG. 3 shows a UPS arrangement 300 in the data center. The UPS arrangement 300 includes a first grid 310 including a first UPS 312 and a second UPS 314, a second grid 320 including a third UPS 322 and a fourth UPS 324, a console 330, a first PDU 342, a second PDU 344, a third PDU 346, a fourth PDU 348, a first rack 350, and a second rack 360. The console 330 is similar to the central management unit 250 and the console may include a console controller 332 and console data storage 334. The first rack 350 includes a first server 352 and a second server 352. The second rack 360 includes a third server 362, a fourth server 364, and a fifth server 366. The first PDU 342 and the second PDU 344 are connected to the first rack 350 through a first connection 372 and a second connection 374, respectively. The third PDU 346 and the fourth PDU 348 are connected to the second rack 360 through a third connection 376 and a fourth connection 378, respectively. The first grid 310 and the second grid 320 are connected to a power source 380 that may include a power utility source or a power generator source.

As an operation overview of the UPS arrangement 300, the PSUs in the first rack 350 and the second rack 360 may draw power from at least one UPS in the first grid 310 and/or the second grid 320. In a case where a single grid is sufficient to support the amount of workload in the first rack 350 and the second rack 360, one or more UPS in the single grid may be used. In various embodiments, the console 330 may be configured to select the one or more UPS in the single grid based upon UPS parameters and the PSU configurations that are stored in the console storage 334. For example, either the first UPS 312 or the second UPS 314 is required from the first grid 310 to supply power to the PSUs. In this example, the console may select the first UPS 312 or the second UPS 314 based upon their corresponding UPS parameters and the PSUs configurations. The UPS parameters may include amount of wear levelling of the UPS and associated historical data. The historical data may include previous demands on each UPS in previous time periods, the amount of workloads that the corresponding UPS supported during the previous time periods, the amount of power capping used in different time periods, performance statistics of the associated grid, and the like. The PSU configurations can include updated configurations that the console data storage 334 receives from the BMCs. With the selection by the console 330 of the UPS to be utilized, reconfigurations of the PSUs may be implemented to conform to the configurations of the selected UPS. Only two grids with a total of four UPS are shown for simplicity and the data center may include additional grids including multiple UPS on each grid.

The first grid 310 and the second grid 320 may be configured to satisfy N+1 redundancy requirements when either grid can support the power requirements of the PSUs in the first rack 350 and the second rack 360 at a particular time period. For example, the activated PSUs in the first rack 350 and the second rack 360 support a steady-state power requirement of 10 kW. In this example, each of the first grid 310 and the second grid 320 may be configured to support at least 10 kW of steady-state power requirements to satisfy the N+1 redundancy requirements. In another example, the power requirements of the first rack 350 and the second rack 360 are capped to include a maximum value of 8 kW. In this other example, each of the first grid 310 and the second grid 320 may be configured to support at least 8 kW of power to satisfy the N+1 redundancy requirements. The power capping of the first rack 350 and the second rack 360 may be based upon the configurations of the selected UPS to be utilized by the console 330.

The console 330 includes hardware circuitry that controls the use of each UPS in the first grid 310 and the second grid 320. The console controller 332 can be configured to use the first UPS 312, second UPS 314, third UPS 322, fourth UPS 324, or a combination thereof, based upon wear levelling of each UPS and/or based upon the amount of workload to be supported in the first rack 350 and/or the second rack 360. In various embodiments, the console controller 332 selects the UPS with the least amount of wear levelling and/or the UPS that supports the workload that requires at least sixty percent of UPS' capacity. For example, the first grid 310 is selected as a primary source of electrical energy to support the PSUs of the first rack 350. In this example and in order to maximize UPS efficiency, the console controller 332 may utilize the first UPS 312 when the amount of workload to support in the first rack 350 requires at least sixty percent of the first UPS capacity. Instead of distributing the amount of workload between the first UPS 312 and the second UPS 314, the console controller 332 may use the first UPS 312 only to obtain maximum efficiency. In various embodiments, the console controller 332 may also determine the wear levelling of the first UPS 312 as compared to the second UPS 314. In a case where the first UPS 312 includes higher amount of wear levelling, the console controller 332 may utilize the second UPS 314 instead of the first UPS 312. In this manner, the console 330 facilitates increase in the UPS efficiency and distribution of wear levelling across the UPS.

The console data storage 334 may include hardware circuitry that stores the UPS parameters and the PSU configurations. The console data storage 334 may be configured to update the UPS parameters and the PSU configurations at a particular time interval. The UPS parameters may be updated by recording previous UPS configurations that were implemented by the console 330. The PSU configurations may be updated by receiving information from the BMCs of corresponding rack servers. During a UPS optimization operation, the console controller 332 may read the UPS parameters and the PSU configurations from the console data storage 334. Based upon the read UPS parameters and PSU configurations, the console controller 332 may select the one or more UPS to be used in the data center. The UPS optimization operation includes selecting of UPS to be used, configuring of the selected UPS, and reconfiguring of the PSUs to correspond to the configuration of the selected UPS.

In various embodiments, the console controller 332 may use the stored UPS parameters to adjust in advance future configurations of the first UPS 312, second UPS 314, third UPS 322, fourth UPS 324, or a combination thereof. For example, the console controller 332 may predict what will be the demand on each UPS during a particular time of the day. In this example, the console controller 332 may also predict the UPS wear levelling that is associated to the predicted demand. Predicting the demand and the associated wear leveling in advance may allow the console controller 332 to share future load reconfigurations across the UPS to obtain maximum efficiency and even wear levelling.

The first UPS 312 may include hardware circuitry that sustains the supply of electrical energy to the first rack 350 and the second rack 360. The first UPS 312 may allow the power source 380 to directly supply the electrical energy to the first PDU 342 and the second PDU 346. When the power source 380 fails, the first UPS 312 may use a battery to continue the supply of electrical energy until the power is restored. Since the efficiency of the first UPS 312 varies with respect to workload factor, the first UPS may be configured to support the workload that requires at least 60% of the first UPS' capacity. In various embodiments, the second UPS 314 in the first grid 310 may be utilized as a back-up UPS except when the wear level of the first UPS 312 is greater than the second UPS. The second UPS 314, third UPS 322, and the fourth UPS 324 include similar functions and parameters as the first UPS 312.

The first rack 350 may include multiple servers and a top-of-rack switch that facilitates electrical connections of the multiple servers to the first grid 310 and/or the second grid 320. The first rack 350 may be one of the tens or hundreds of racks in the data center to perform various operations. The first rack 350 may support a rack workload (Rworkload) that includes a sum of workloads in the first server 352 and the second server 354. In various embodiments, the console controller 332 may be configured to use a workload threshold (Rthreshold) for each rack to determine whether the UPS optimization operation is to be performed on the corresponding rack. When the Rworkload is lesser than the Rthreshold, the UPS optimization operation may be applied to control the use of each UPS based upon the amount of the Rworkload that the rack supports, based upon wear levelling of each UPS to be used, the historical data associated to each UPS, or a combination thereof. The Rthreshold for each rack may be derived after a determination by the console 330 of total workloads across all racks in the data center. For example, the value of the Rthreshold for each rack may facilitate satisfaction of the N+1 redundancy requirements, provides even wear levelling of the UPS to be used, and/or maximizes distribution efficiency of the workloads across the UPS in the other grids.

The first server 352 is similar to the information handling system 100. In various embodiments, the BMC of the first server 352 may be configured to update the console 330 of the PSU configurations at a configured regular time interval. The PSU configurations may include PSU active status, PSU stand-by status, PSU power capping value, predicted operations of the PSU, and the like. In response to sending of the PSU configurations to the console 330, the BMC may receive instructions to perform PSU reconfigurations such as the application of power capping values, placing one or more PSUs at standby mode, and the like.

Figure 4:
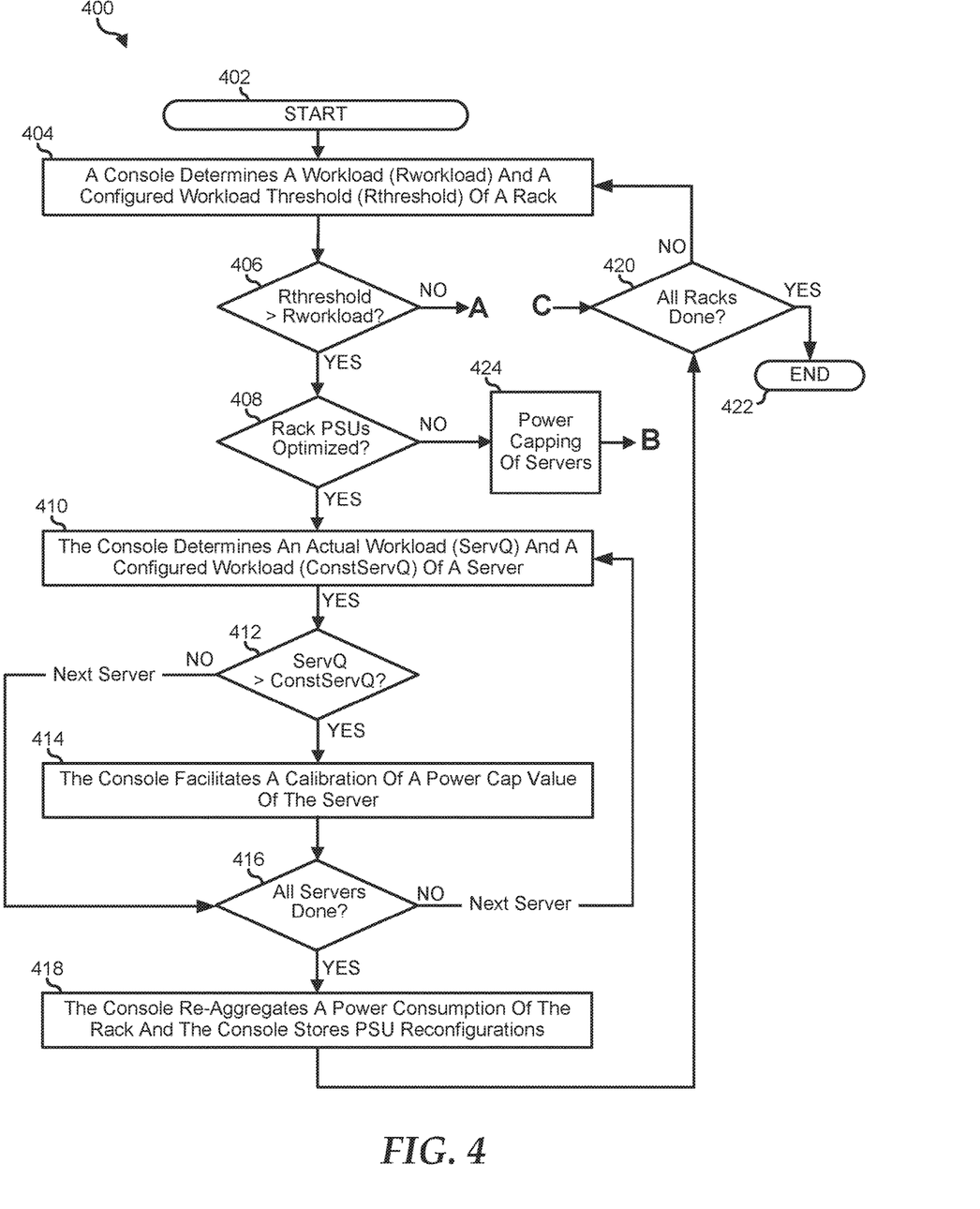
FIGS. 4-6 are flow charts showing a method of managing a UPS operation in the data center to even wear levelling in each UPS according to an embodiment of the present disclosure.
Figure 5:
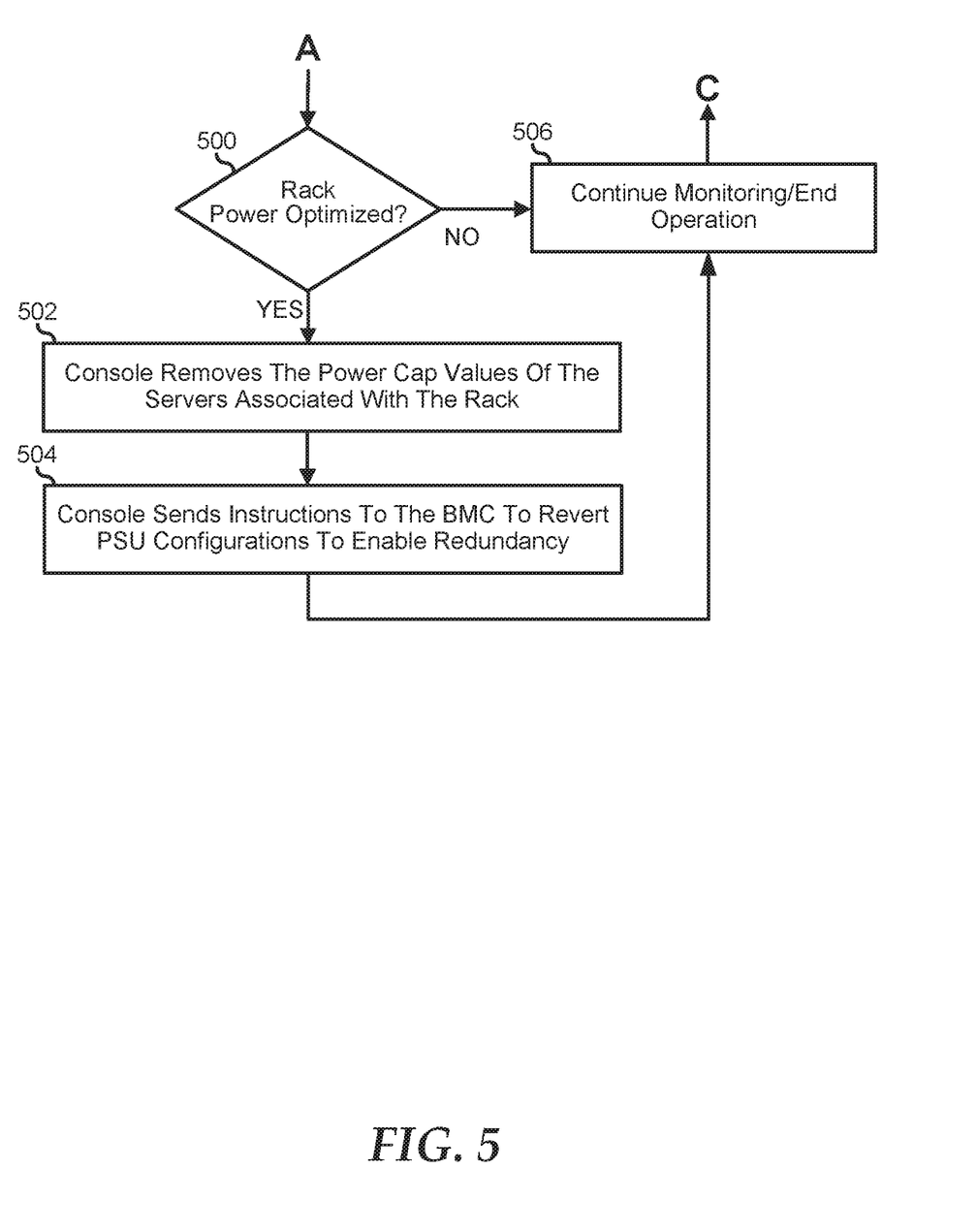
Figure 6:
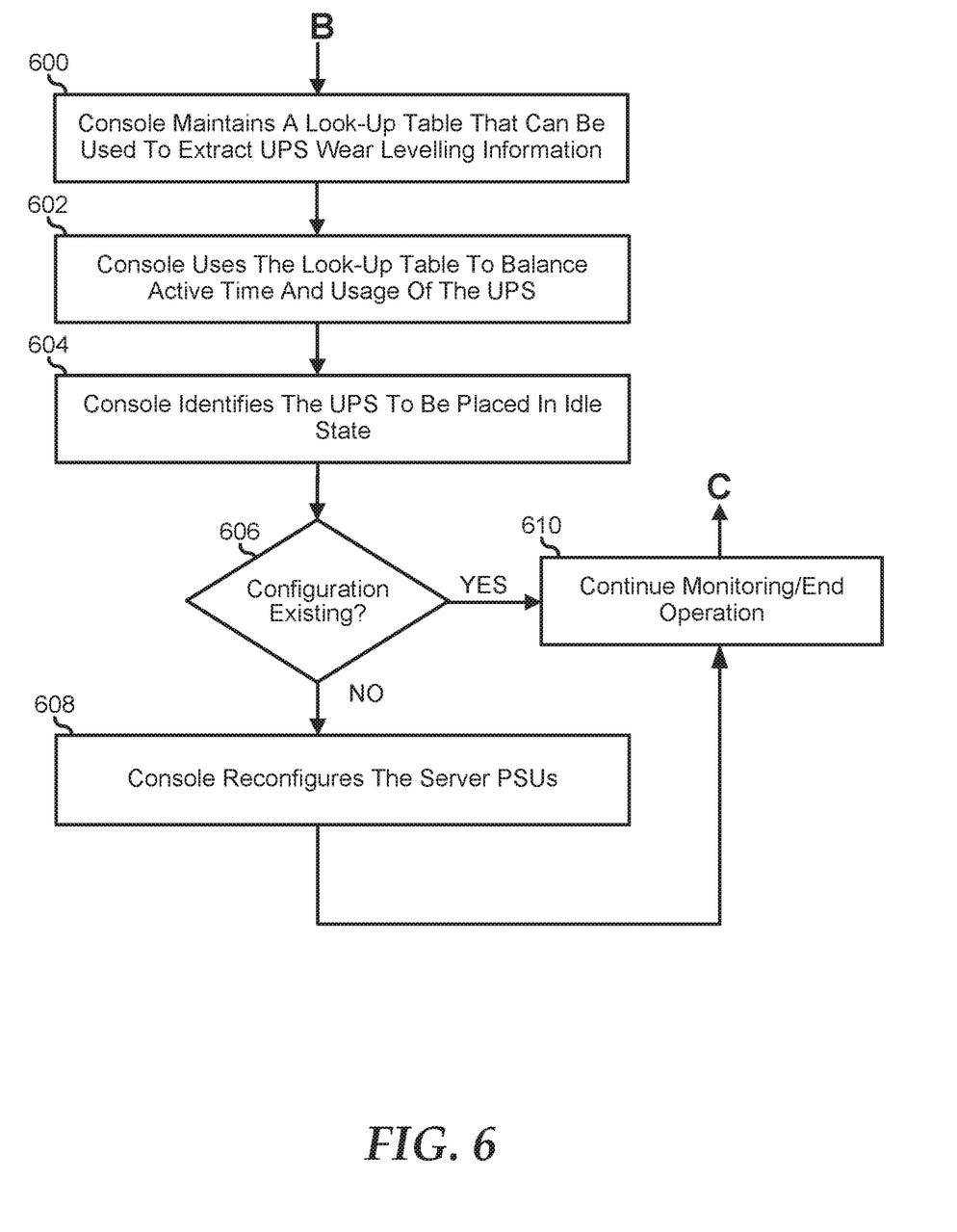

FIGS. 4-6 show a method 400 for managing UPS operations in the power network. The power network includes a system that utilizes grids, multiple UPS, racks, servers, and the like. The method 400 may increase UPS efficiency and facilitates even wear levelling of the UPS, starting at block 402. At block 404, the console determines the Rworkload and the Rthreshold of the rack. At a preconfigured time interval, the console 330 may implement the UPS optimization operation on each one of the racks in the data center. In other cases, the UPS optimization operations may be implemented on a portion of the total number of racks in the data center. In various embodiments, the console 330 may receive from the end-user a value of the Rthreshold, or the Rthreshold may be read from a look-up table in the console data storage 334. The look-up table may include preconfigured values of the Rthreshold for each rack in the data center. The console 330 may also receive the amount of the Rworkload from the BMCs of the first rack 350, which is the first rack under consideration.

At block 406, the console compares the determined Rthreshold to the Rworkload. In response to the Rworkload that is less than the Rthreshold, the console 330 determines whether the rack PSUs have been optimized at block 408. In a case where the Rworkload is greater than the Rthreshold, the UPS optimization operation may not be applied and the process continues at blocks 500-506 where the PSUs are reconfigured to enable redundancy.

In response to the determination that the rack PSUs has been optimized, and at block 410, the console 330 determines the actual workload (ServQ) and the configured workload (ConstServQ) of each server in the rack. For example, the console 330 determines the actual workload and the configured workload of the first server 352. In this example, the actual workload includes the workload at a particular time period, while the configured workload may include an updated value of the power capping from the previous UPS optimization operation. At block 412, the console 330 compares the actual workload with the configured workload of the server under consideration. In response to the actual workload that is greater than the configured workload, and at block 414, the console 330 facilitates the calibration of the configured power cap value of the server. For example, the actual workload requires 10 kW of power and the present power cap value of the rack PSUs includes 5 kW. In this example, the console 330 may facilitate calibration of the power cap values to about 10 kW. In response to the actual workload that is lesser than the configured workload, the UPS optimization operation continues at block 416.

At block 416, the console 330 determines whether the server at block 414 or block 412 includes the last server in the rack under consideration. In a case where the recently processed server is not the last server in the rack under consideration, the console 330 selects the next server and the selected server is processed at block 410. However and when the recently processed server includes the last server in the rack under consideration, the operation continues at block 418 where the console 330 re-aggregates the power consumption of the rack under consideration on account of the performed calibration. The re-aggregated power consumption may include new PSU configurations that are communicated by the BMC to the console 330. The new PSU configurations may be stored in the console data storage 334. At block 420, the console 330 determines whether the rack under consideration is the last rack to be optimized. In response to being the last rack to be optimized, and at block 422, the UPS optimization operation ends. Otherwise, the console 330 selects the next rack and the selected rack is processed at block 404.

Returning to block 408 and where the rack PSUs are determined to have not been optimized, then at block 424, the console 330 performs power capping of the servers. For example, the rack under consideration includes the first server 352 and the second server 354. In this example, the power capping of the rack PSUs may limit power consumption in the first server 352 and the second server 354 of the rack under consideration. With the power capping of the PSUs, the console 330 may perform UPS load optimization action by reconfiguring the rack PSUs based upon UPS wear leveling information. For example, and at block 600, the console 330 maintains the look-up table that can be used to extract the wear levelling information of the UPS. In this example, the wear levelling information may be based on uptime, aging, battery health, and the like. At block 602, the console 330 utilizes the look-up table to balance the active time and usage of the UPS to be utilized. As a consequence, and at block 604, the console 330 identifies the UPS of the present grid that will be placed in idle mode. At block 606, the console 330 determines whether the present configuration of the UPS has been applied to the configurations of the PSUs. In response to the PSUs that were not adjusted according to the present UPS configuration, and at block 608, the console 330 facilitates reconfiguration of the PSUs. Otherwise, and at block 610, the console 330 may continue to monitor the rack under consideration, or the console 330 may end operation and the next rack may be selected at block 420.

Returning to block 406 and in response to the Rworkload that is determined to be higher than the Rthreshold, the console 330 determines whether the rack power under consideration has been optimized at block 500. In a case where the power in the rack PSUs has been optimized, the console 330 facilitates removal of the power capping in the PSUs of the servers that are associated to the rack under consideration. For example, the newly received Rthreshold from the end-user includes a value that is lower than the present Rworkload of the rack under consideration. In this example, the console 330 sends command signals to the respective BMCs to remove the power capping on the PSUs that are associated to the servers. At block 504, the console 330 may facilitate reversion of the previous PSU configurations to enable redundancy. For example, the previous PSU configurations may include lower values. In this example, console 330 reconfigures the lower values to enable redundancy. At block 506, the console 330 continues to monitor the rack under consideration or to stop the optimization operation and the next rack may be selected at block 420.

Figure 7:
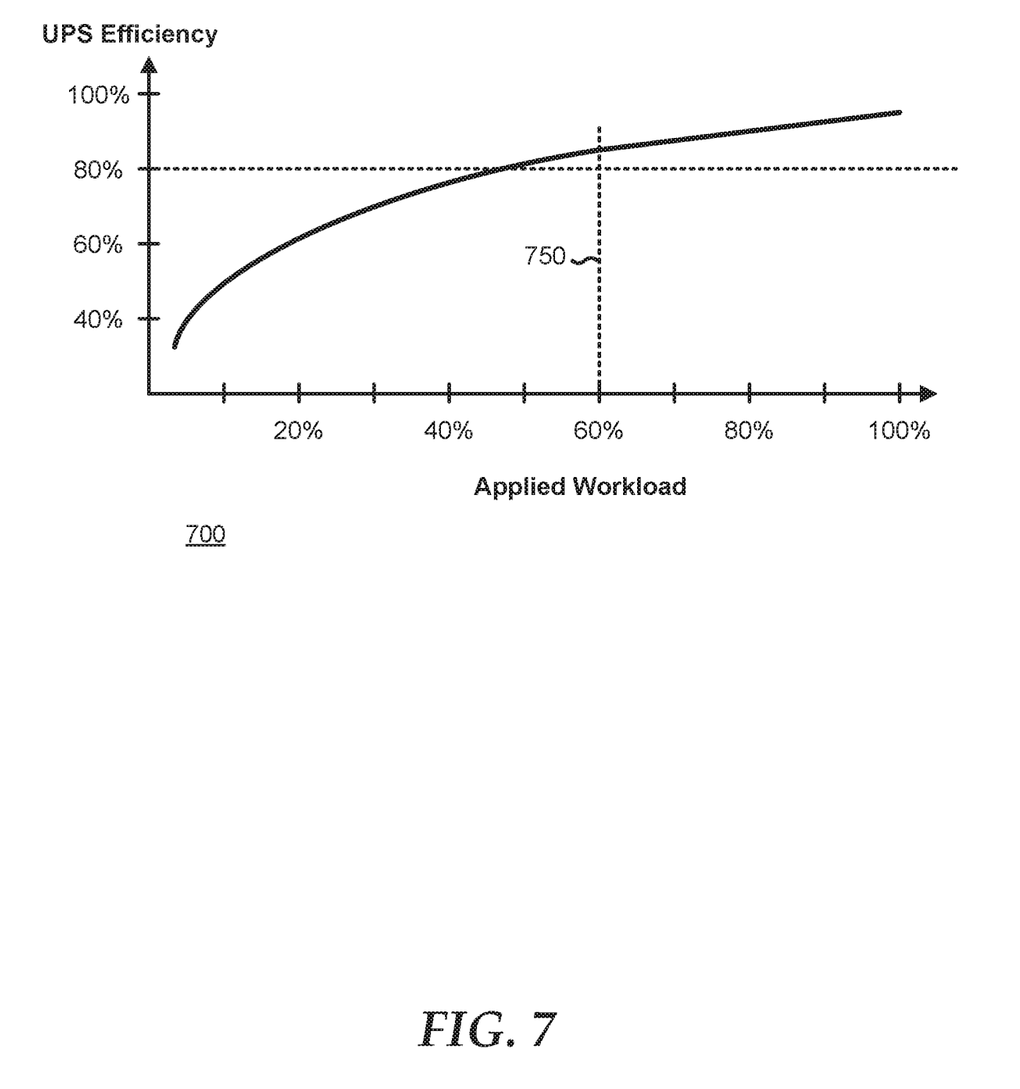
FIG. 7 is a graph of an applied workload and corresponding UPS efficiency according to an embodiment of the present disclosure.

FIG. 7 is a graph 700 showing UPS efficiency at different applied workloads. In the data center, the UPS supports different amount of workloads during different time periods. In various embodiments, the console 330 may be configured to apply a workload 750 to a particular UPS when the workload requires an equivalent of at least sixty percent capacity of the UPS for support.

Figure 8:
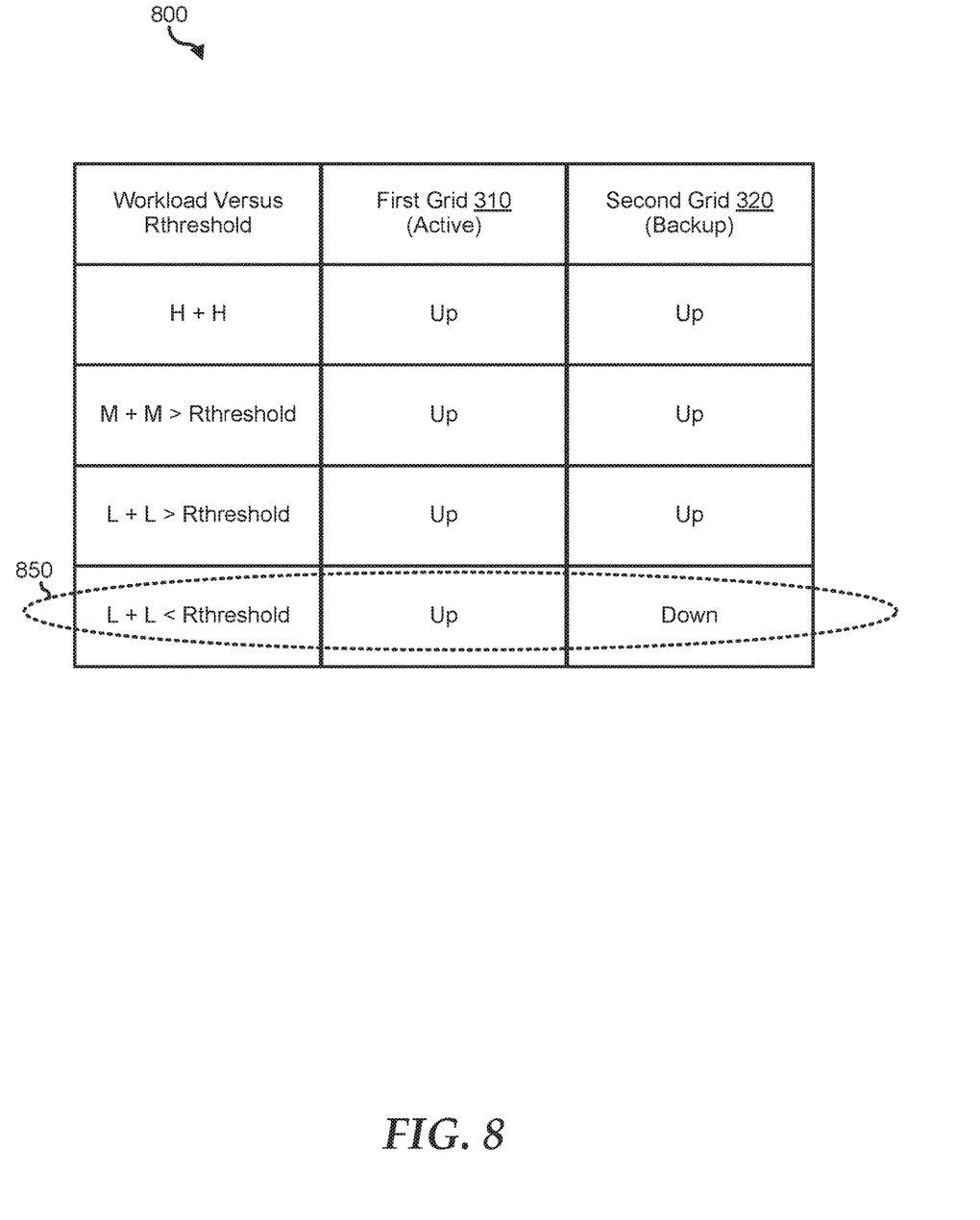
FIG. 8 is a look-up table showing grid configurations in a power network according to an embodiment of the present disclosure.

FIG. 8 shows a look-up table 800 of the UPS configurations in the power network. The look-up table 800 satisfies N+1 redundancy requirements where one grid such as the first grid 310 may be configured as an active grid while the second grid 320 is present for redundancy. In various embodiments, the UPS optimization operation may be implemented when the Rworkload is lesser than the Rthreshold as shown by a portion 850 of the look-up table 800.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

For purposes of this disclosure, the information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, the information handling system can be a personal computer, a laptop computer, a smart phone, a tablet device or other consumer electronic device, a network server, a network storage device, a switch router or other network communication device, or any other suitable device and may vary in size, shape, performance, functionality, and price. Furthermore, the information handling system can include processing resources for executing machine-executable code, such as a central processing unit (CPU), a programmable logic array (PLA), an embedded device such as a System-on-a-Chip (SoC), or other control logic hardware. Information handling system can also include one or more computer-readable medium for storing machine-executable code, such as software or data. Additional components of information handling system can include one or more storage devices that can store machine-executable code, one or more communications ports for communicating with external devices, and various I/O devices, such as a keyboard, a mouse, and a video display. Information handling system can also include one or more buses operable to transmit information between the various hardware components.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system having improved power management, comprising:
    a plurality of grids including at least one uninterruptible power supply (UPS) in each grid to supply power to at least one power supply unit (PSU) in each one of a plurality of racks; and
    a console coupled to the grids and to the racks, wherein the console is configured to determine an amount of wear levelling and an amount of workload to be supported by each UPS, wherein the console configures each UPS based upon the determined amount of wear levelling and the determined amount of workload to be supported, wherein a power capping value in each PSU is adjusted to conform with the configuration of the UPS, and wherein the amount of wear levelling is based on wear levelling information including UPS uptime, UPS aging, and UPS health.

2. The system of claim 1, wherein the power capping value to be adjusted includes the power capping value in a previous UPS optimization operation.

3. The system of claim 2, wherein the UPS optimization operation includes selecting of the UPS to be used, configuring of the selected UPS, and reconfiguring of the PSU to correspond with the configuration of the selected UPS.

4. The system of claim 2, wherein the console determines a rack threshold based upon a total workload of the racks, wherein the console performs the UPS optimization operation in response to the rack threshold that is greater than the workload in the rack.

5. The system of claim 1, wherein the console configures the UPS by assigning the workload that is equivalent to at least sixty percent capacity of the UPS.

6. The system of claim 1, wherein the console controls an operation of the UPS by activating the UPS that includes a least amount of wear levelling.

7. The system of claim 1, wherein each rack includes a server with a baseboard management controller that is configured to supply server information to the console.

8. The system of claim 7, wherein the server information includes the workload and PSU configurations of the server.

9. The system of claim 1, wherein the console further includes a data storage that stores updated amount of wear levelling in each UPS.

10. The system of claim 9, wherein the console utilizes the data storage to predict demand and associated wear levelling in each UPS.

11. An information handling system, comprising:
    a data storage that stores an amount of wear levelling and an amount of workload to be supported by an uninterruptible power supply (UPS) of each one of a plurality of grids, wherein the data storage stores a power capping value of a power supply unit (PSU) of each one of a plurality of racks, wherein the UPS of each grid is configured to supply power to each PSU; and a console controller that configures each UPS based upon the determined amount of wear levelling and the determined amount of workload to be supported by the UPS, wherein the power capping value of each PSU is adjusted to conform with the configuration of the UPS, wherein the stored power capping value to be adjusted includes the power capping value in a previous UPS optimization operation, and the console controller determines a rack threshold based upon a total workload of the racks, wherein the console performs the UPS optimization operation in response to the rack threshold that is greater than the workload in the rack.

12. The information handling system of claim 11, wherein the UPS optimization operation includes selecting of the UPS to be used, configuring of the selected UPS, and reconfiguring of the PSU to correspond with the configuration of the selected UPS.

13. The information handling system of claim 11, wherein the console controller configures each UPS by assigning the workload that is equivalent to at least sixty percent capacity of the UPS.

14. The information handling system of claim 11, wherein the console controller controls an operation of the UPS by activating the UPS that includes a least amount of wear levelling.

15. The information handling system of claim 11, wherein each rack includes a server with a baseboard management controller that is configured to supply server information to the console.

16. The information handling system of claim 15, wherein the server information includes the workload and PSU configurations of the server.

17. A method, comprising:

determining, by console hardware circuitry, an amount of wear levelling and an amount of workload to be supported by an uninterruptible power supply (UPS) of each one of a plurality of grids, wherein the UPS of each grid is configured to supply power to a power supply unit (PSU) of each one of a plurality of racks; and configuring each UPS based upon the determined amount of wear levelling and the determined amount of workload to be supported by the UPS, wherein a power capping value in each PSU is adjusted to conform with the configuration of the UPS, and wherein the amount of wear levelling is based on wear levelling information including UPS uptime, UPS aging, and UPS health.

18. The method of claim 17, wherein the power capping value to be adjusted includes the power capping value in a previous UPS optimization operation.

* * * * *